United States Patent
Barnes

(10) Patent No.: US 10,195,968 B2
(45) Date of Patent: Feb. 5, 2019

(54) DEPLOYABLE SEAT SYSTEM

(71) Applicant: JAGUAR LAND ROVER LIMITED, Whitley, Coventry, Warwickshire (GB)

(72) Inventor: Ian Barnes, Rugby (GB)

(73) Assignee: Jaguar Land Rover Limited, Whitley, Coventry (GB)

( * ) Notice: Subject to any disclaimer, the term of this patent is extended or adjusted under 35 U.S.C. 154(b) by 70 days.

(21) Appl. No.: 15/124,325

(22) PCT Filed: Mar. 5, 2015

(86) PCT No.: PCT/EP2015/054640
§ 371 (c)(1),
(2) Date: Sep. 7, 2016

(87) PCT Pub. No.: WO2015/132345
PCT Pub. Date: Sep. 11, 2015

(65) Prior Publication Data
US 2017/0021747 A1    Jan. 26, 2017

(30) Foreign Application Priority Data

Mar. 7, 2014 (GB) .................................. 1404035.6
Mar. 7, 2014 (GB) .................................. 1404038.0

(51) Int. Cl.
*B60N 2/30* (2006.01)
*B60N 3/06* (2006.01)
(Continued)

(52) U.S. Cl.
CPC ............. *B60N 2/3095* (2013.01); *B60N 3/06* (2013.01); *B60R 9/06* (2013.01); *B60R 9/10* (2013.01)

(58) Field of Classification Search
CPC .. B60N 2/3022; B60N 2/3056; B60N 2/3072; B60N 2/3075; B60N 2/3077;
(Continued)

(56) References Cited

U.S. PATENT DOCUMENTS 2,834,398 A    5/1955   Thelen
3,501,190 A *  3/1970   McCrea .................... B60P 3/36
                                                  224/42.3
(Continued)

FOREIGN PATENT DOCUMENTS

EP    1707431 A1   10/2006
EP    2033839 A1    3/2009
(Continued)

OTHER PUBLICATIONS

Combined Search and Examination Report for application No. GB1404038.0, dated Sep. 19, 2014, 8 pages.
(Continued)

*Primary Examiner* — Jason S Morrow
(74) *Attorney, Agent, or Firm* — Reising Ethington P.C.

(57) ABSTRACT

A seating system for use with a vehicle. The seating system includes: a seat device arranged proximal to a rear edge of the vehicle, arranged to be deployed at least partially beyond the rear edge; and a platform arranged to be moveable between a stowed configuration and a deployed configuration. In the deployed configuration, the platform is arranged to be positioned for use as a footrest by a user seated on the seat device.

19 Claims, 8 Drawing Sheets

(51) Int. Cl.
*B60R 9/06* (2006.01)
*B60R 9/10* (2006.01)

(58) Field of Classification Search
CPC ...... B60N 2/3079; B60N 2/3095; B60N 2/32; B60N 2/36; B60N 3/06; B60R 9/10; B60R 3/02; B60R 9/06
USPC .............................................. 296/66, 69, 75
See application file for complete search history.

(56) References Cited

U.S. PATENT DOCUMENTS

| | | | |
|---|---|---|---|
| 6,179,362 B1 | 1/2001 | Wisniewski et al. | |
| 7,281,745 B1 | 10/2007 | Meinke et al. | |
| 8,528,976 B2 * | 9/2013 | Wimberley | B60N 2/015 24/275 |
| 8,556,283 B2 * | 10/2013 | Coochesfahani | B61D 23/025 105/447 |
| 9,120,429 B2 * | 9/2015 | Lungershausen | B60R 9/10 |
| 2004/0183329 A1 | 9/2004 | Macey et al. | |
| 2004/0239136 A1 | 12/2004 | Nolle | |
| 2005/0264048 A1 | 12/2005 | Collins | |
| 2008/0142559 A1 * | 6/2008 | Lim | B60R 9/06 224/489 |
| 2008/0211270 A1 | 9/2008 | Hu et al. | |
| 2010/0089957 A1 * | 4/2010 | Barth | B60R 9/06 224/497 |
| 2010/0225082 A1 | 9/2010 | Krosschell et al. | |
| 2011/0108592 A1 * | 5/2011 | Lee | B60R 9/06 224/488 |
| 2011/0198879 A1 | 8/2011 | Kemp et al. | |
| 2015/0239372 A1 * | 8/2015 | Bauer | B62D 33/03 296/57.1 |
| 2016/0046230 A1 * | 2/2016 | Choi | B60Q 1/30 340/435 |
| 2016/0096483 A1 * | 4/2016 | Cha | B60R 9/06 224/496 |
| 2017/0320419 A1 * | 11/2017 | Gobart | B60N 3/02 |
| 2018/0099589 A1 * | 4/2018 | Murray | B60N 2/32 |

FOREIGN PATENT DOCUMENTS

| | | |
|---|---|---|
| FR | 2838687 A1 | 10/2003 |
| FR | 2912705 A1 | 8/2008 |
| FR | 2967103 A1 | 5/2012 |
| GB | 1302998 A | 1/1973 |
| JP | S6319449 U | 2/1988 |
| JP | H0361439 U | 6/1991 |
| JP | 2008265388 A | 11/2008 |

OTHER PUBLICATIONS

International Search Report for International application No. PCT/EP2015/054640, dated Aug. 31, 2015, 7 pages.
Written Opinion for International application No. PCT/EP2015/054640, dated Aug. 31, 2015, 10 pages.
British Examination Report for application No. GB1404038, dated Jul. 5, 2017, 4 pages.

* cited by examiner

DEPLOYABLE SEAT SYSTEM

TECHNICAL FIELD

The present invention relates to a deployable seat system, in particular, but not exclusively, a deployable seat system that is configured to be deployed from a vehicle.

BACKGROUND

Vehicles such as sports utility vehicles or pickup trucks typically comprise a closure element such as a tailgate or a split tailgate that opens downwards (i.e. a drop down tailgate). The downwards-opening tailgates on these vehicles typically open to be level with the base or floor of the boot (i.e. the load floor). This allows for ease of loading of cargo and other luggage into the boot of the vehicle if a user places the cargo onto the drop down tailgate and pushes it along the load floor into the boot. In this way, especially if the items are heavy or bulky, the user would not have to reach into the vehicle to load the cargo.

Further, drop down tailgates are usually designed to be able to support the full weight of users standing or sitting on it, particularly when the vehicle is stationary.

However, in vehicles with a single tailgate that opens sideways or upwards, sitting at the rear of the vehicle when it is stationary is hindered by the lip of the boot and may also have reduced headroom.

Vehicles with high ground clearance can be difficult for users to enter and exit. Accordingly, steps or support surfaces may be provided for users. Typically, the steps are permanently fixed to the exterior of a vehicle with high ground clearance, and may be configured to move into a stowed configuration. However, attachments such as steps to the exterior of the vehicle can adversely affect the aerodynamic performance of the vehicle.

Further, the rear closure element (i.e. the tailgate) of vehicles with high ground clearance may be relatively higher from the ground than the side doors in order to maximise the approach and departure angle of the vehicle. This can make the tailgate particularly difficult to use to enter and exit the vehicle.

Vehicle users transporting bicycles typically affix cycle carriers or bicycle racks to the vehicle for carrying the bicycles. Cycle carriers are typically mounted to the rear of the vehicle, particularly on vehicles with high ground clearance, where roof-mounted cycle carriers are less suitable as the height of the vehicle makes it difficult to load and unload bicycles. Most cycle carriers and bicycle racks are multi-component devices that the user must spend time carefully assembling and attaching securely to the vehicle.

The present invention has been devised to mitigate or overcome at least some of the above-mentioned problems.

SUMMARY OF THE INVENTION

According to an aspect of the present invention there is provided a seating system for use with a vehicle, the seating system comprising: a seat device arranged proximal to a rear edge of the vehicle and moveable between an open configuration and a closed configuration; and a platform arranged to be moveable between a stowed configuration and a deployed configuration, wherein, in the deployed configuration, the platform is arranged to be positioned for use as a footrest by a user seated on the seat device.

Bodywork of the vehicle may conceal the platform when the platform is in the stowed configuration. It may be that the platform is positioned behind, within or underneath a rear bumper of the vehicle when the platform is in the stowed configuration. The platform may be deployed from its position behind, within or underneath the rear bumper. Advantageously, a concealed platform is more aesthetically pleasing and reduces the chances of damage to the platform when the platform is not in use.

The seat device may be arranged to be deployed at least partially beyond the rear edge of the vehicle. Further, the vehicle may comprise a boot and the seat device forms at least part of a load floor of the boot when in the closed configuration.

Additionally, the seating system of any of the above aspects of the present invention may further comprise the following.

The seat device may comprise a seat and a seatback, wherein: in the open configuration, the seatback and seat are separated such that a user can sit on the seat with their back against the seatback; and in the closed configuration, the seatback being at least substantially positioned on top of the seat.

Optionally, the seat device may hinge between the open configuration and the closed configuration.

The seating system may comprise at least one from the group of: a runner, a rail, a guide and a track; and wherein the seat device is arranged to be deployed at least partially beyond the rear edge of the vehicle by sliding. The runner, the rail, the guide and/or the track may be affixed proximal to an edge of the seat of the seat device When the seat device comprises a seat and a seatback, a back of the seatback may be substantially flat to form the at least part of the load floor of the boot when the seat device is in the closed configuration.

When the seat device comprises a seat and a seatback, a back of the seatback may be substantially flush with the load floor of the boot when the seat device is in the closed configuration.

If the seat device is deployed at least partially beyond the rear edge of the vehicle, the platform may extend further beyond the rear edge when in the deployed configuration.

When the seat device comprises a seat and a seatback, the front of the seatback may be of complementary shape to the seat of the seat device.

The seat device may be a bench-style seat with no demarcation to indicate the seating positions.

When the seat device comprises a seat and a seatback, the back of the seatback may comprise a means for securing objects. The means for securing objects comprises at least one of: a hook or a net.

The seat device may be deployed at least partially beyond the rear edge of the vehicle whilst in the closed configuration.

The deployable platform may be arranged to be concealed by a moveable cover when in the stowed configuration.

The deployable platform may be arranged to be concealed by bodywork of the vehicle when the platform is in the stowed configuration. Said bodywork that conceals the platform in the stowed position may comprise a rear bumper of the vehicle. It may be that the platform is positioned behind, within or underneath a rear bumper of the vehicle when the platform is in the stowed configuration. The platform may be deployed from its position behind, within or underneath the rear bumper. Advantageously, a concealed platform is more aesthetically pleasing and reduces the chances of damage to the platform when the platform is not in use.

The platform may be arranged in its deployed configuration to provide a support surface disposed partway between ground level and a lower edge of a vehicle closure element opening. The closure element opening may be the opening to a boot of the vehicle.

Optionally, a first side of the deployable platform comprises a means for enhancing grip.

The platform may be arranged in its deployed configuration to provide a means for securing at least one bicycle. The means for securing at least one bicycle may comprise a clamp, a lock or other suitable means for temporarily engaging the at least one bicycle for attachment to the platform.

The platform system may comprise a means for rotating the platform when in the deployed configuration. The means for rotating the platform may comprise a hinge joint, a pivot joint or other suitable means. The ability to rotate the platform is beneficial if the platform is being used as a bicycle rack, then the bicycles on the platform may be rotated away from the vehicle to enable, for example, the tailgate of the vehicle to be opened for access to the boot of the vehicle.

The means of rotating the platform may be arranged with interlocks to optionally secure the platform at a plurality of angles. For example, a first interlock may be used to secure the platform at an angle suitable for securing the bicycles whilst the vehicle is in motion, and a second interlock may be used to secure the platform at an angle suitable for securing the bicycles whilst the platform is rotated and the tailgate is open.

The platform may be arranged in its deployed configuration to provide a support surface disposed partway between ground level and a lower edge of a vehicle closure element opening and/or a means for securing at least one bicycle.

Optionally, a first side of the platform comprises the support surface and a second side of the platform comprises the means for securing at least one bicycle. The platform may be arranged to be moveable between first and second configurations, the first side of the platform being directed substantially upwards in the first configuration and the second side of the platform being directed substantially upwards in the second configuration. This has the benefit of making the means for securing at least one bicycle relatively further away from the vehicle than when the platform is configured to provide the support surface.

The first side of the platform and the second side of the platform may be substantially opposite sides of the platform.

The platform system may comprise a means for rotating the platform to move the platform between the first and second configurations. In this way, the means of rotating the platform may be used to configure the first side of the platform to face substantially upwards to provide the support surface, or to configure the second side of the platform to face substantially upwards in to provide the means for securing at least one bicycle.

The platform may comprise lights. The lights may comprise one or more from the group comprising of: a rear position light, a brake light, a reversing light and a turn signal lights. Additionally or alternatively, the platform may comprise a registration plate holder.

The platform system may comprise a means for deploying the platform between the stowed configuration and the deployed configuration. The means for deploying the platform may comprise at least one from the group comprising of: a telescopic arm, a runner, a rail, a guide, a track or a hinge. The means for deploying the platform may comprise one or more actuators. The or each actuators may be controlled from the cabin of the vehicle. Additionally or alternatively, the or each actuator may be controlled wirelessly, for example using a radio frequency vehicle key fob.

The platform may be arranged to be hidden within the vehicle bodywork when in the stowed configuration and is arranged to be at least partially located at least partially outside the vehicle bodywork when in the deployed configuration.

The invention may extend to a vehicle comprising the seating system of any of the above aspects of the invention. The seat device of the seating system may face away from the vehicle when deployed at least partially beyond the rear edge of the vehicle. The vehicle may comprise a means for moving the moveable cover, wherein the moveable cover is arranged to be at least part of the rear bumper of the vehicle.

According to another aspect of the invention there is provided a platform system for use with a vehicle, the platform system comprising a deployable platform configurable between a stowed configuration and a deployed configuration wherein the deployable platform is arranged to be concealed by a moveable cover when in the stowed configuration.

The movable cover may comprise bodywork of the vehicle, such as a rear bumper of the vehicle. It may be that the platform is positioned behind, within or underneath a rear bumper of the vehicle when the platform is in the stowed configuration. The platform may be deployed from its position behind, within or underneath the rear bumper. Advantageously, a concealed platform is more aesthetically pleasing and reduces the chances of damage to the platform when the platform is not in use.

The platform may be arranged in its deployed configuration to provide a support surface disposed partway between ground level and a lower edge of a vehicle closure element opening. The closure element opening may be the opening to a boot of the vehicle.

Optionally, a first side of the deployable platform comprises a means for enhancing grip.

The platform may be arranged in its deployed configuration to provide a means for securing at least one bicycle. The means for securing at least one bicycle may comprise a clamp, a lock or other suitable means for temporarily engaging the at least one bicycle for attachment to the platform.

The platform system may comprise a means for rotating the platform when in the deployed configuration. The means for rotating the platform may comprise a hinge joint, a pivot joint or other suitable means. The ability to rotate the platform is beneficial if the platform is being used as a bicycle rack, then the bicycles on the platform may be rotated away from the vehicle to enable, for example, the tailgate of the vehicle to be opened for access to the boot of the vehicle.

The means of rotating the platform may be arranged with interlocks to optionally secure the platform at a plurality of angles. For example, a first interlock may be used to secure the platform at an angle suitable for securing the bicycles whilst the vehicle is in motion, and a second interlock may be used to secure the platform at an angle suitable for securing the bicycles whilst the platform is rotated and the tailgate is open.

The platform may be arranged in its deployed configuration to provide a support surface disposed partway between ground level and a lower edge of a vehicle closure element opening and/or a means for securing at least one bicycle.

Optionally, a first side of the platform comprises the support surface and a second side of the platform comprises the means for securing at least one bicycle. The platform may be arranged to be moveable between first and second configurations, the first side of the platform being directed substantially upwards in the first configuration and the second side of the platform being directed substantially upwards in the second configuration. This has the benefit of making the means for securing at least one bicycle relatively further away from the vehicle than when the platform is configured to provide the support surface.

According to another aspect of the invention, there is provided a platform system for use with a vehicle, the platform system comprising a platform, wherein a first side of the platform comprises a support surface and a second side of the platform comprises a means for securing at least one bicycle, wherein the platform system is moveable between a first configuration and a second configuration, the first side of the platform being directed substantially upwards in the first configuration and the second side of the platform being directed substantially upwards in the second configuration.

The first side of the platform and the second side of the platform may be substantially opposite sides of the platform.

The platform system may comprise a means for rotating the platform to move the platform between the first and second configurations. In this way, the means of rotating the platform may be used to configure the first side of the platform to face substantially upwards to provide the support surface, or to configure the second side of the platform to face substantially upwards in to provide the means for securing at least one bicycle The platform may comprise lights. The lights may comprise one or more from the group comprising of: a rear position light, a brake light, a reversing light and a turn signal lights. Additionally or alternatively, the platform may comprise a registration plate holder.

The platform system may comprise a means for deploying the platform between a stowed configuration and a deployed configuration. The first and second configurations are variants of the deployed configuration. The means for deploying the platform may comprise at least one from the group comprising of: a telescopic arm, a runner, a rail, a guide, a track or a hinge. The means for deploying the platform may comprise one or more actuators. The or each actuator may be controlled from the cabin of the vehicle. Additionally or alternatively, the or each actuator may be controlled wirelessly, for example using a radio frequency vehicle key fob.

The platform may be arranged to be hidden within the vehicle bodywork when in the stowed configuration and is arranged to be at least partially located at least partially outside the vehicle bodywork when in the deployed configuration. Said bodywork may comprise a rear bumper of the vehicle.

It may be that the platform is positioned behind, within or underneath a rear bumper of the vehicle when the platform is in the stowed configuration. The platform may be deployed from its position behind, within or underneath the rear bumper. Advantageously, a concealed platform is more aesthetically pleasing and reduces the chances of damage to the platform when the platform is not in use.

The invention may extend to a vehicle comprising the platform system. The vehicle may comprise a means for moving the moveable cover, wherein the moveable cover is arranged to be at least part of the rear bumper of the vehicle.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

The present invention provides a deployable seat device and a deployable platform in accordance with an aspect of the present invention. The deployable seat device and deployable platform may be deployed independently of each other and configured to be deployed from the rear of a vehicle. An example sequence showing the deployment of the deployable seat device and the deployable platform is shown in FIGS. 1a to 1f.

Figure 1A:
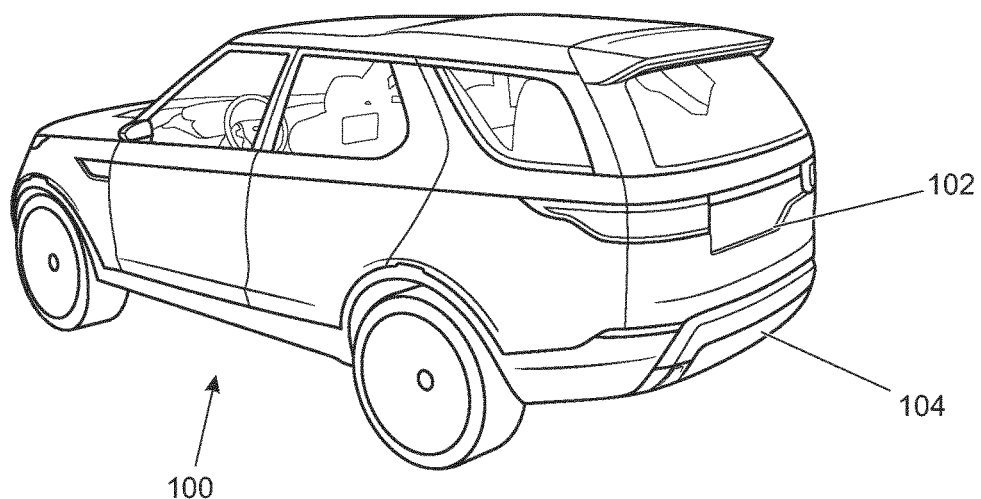
FIGS. 1a to 1f are schematic diagrams showing a deployable seat device and a deployable platform in accordance with an aspect of the present invention.

FIG. 1a shows a vehicle 100 comprising a closure element (i.e a tailgate 102), a rear bumper 104, a deployable seat device (not visible in FIG. 1a) and a deployable platform (not visible in FIG. 1a) in accordance with aspects of the present invention. The deployable seat device and the deployable platform are in their stowed configuration in FIG. 1a.

Figure 1B:
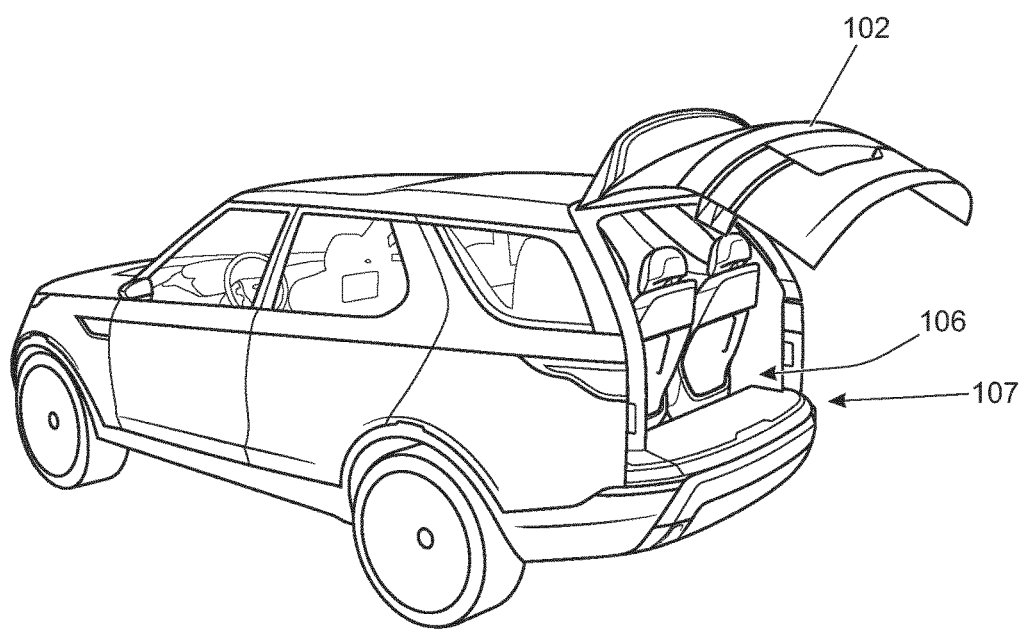

The deployment sequence begins with the tailgate 102 being opened as shown in FIG. 1b, pivoting upwards and rotating about a horizontal axis proximate to the roof of the vehicle 100. The tailgate comprises pneumatic struts to assist the opening of the tailgate 102 and hold it in an open position. The open tailgate 102 exposes a boot 106 (i.e. a trunk) of the vehicle 100. In other embodiments, the tailgate 102 may pivot sideways about a vertical axis proximate to the side of the vehicle 100. The closure element opening comprises a lower edge 107.

Figure 1C:
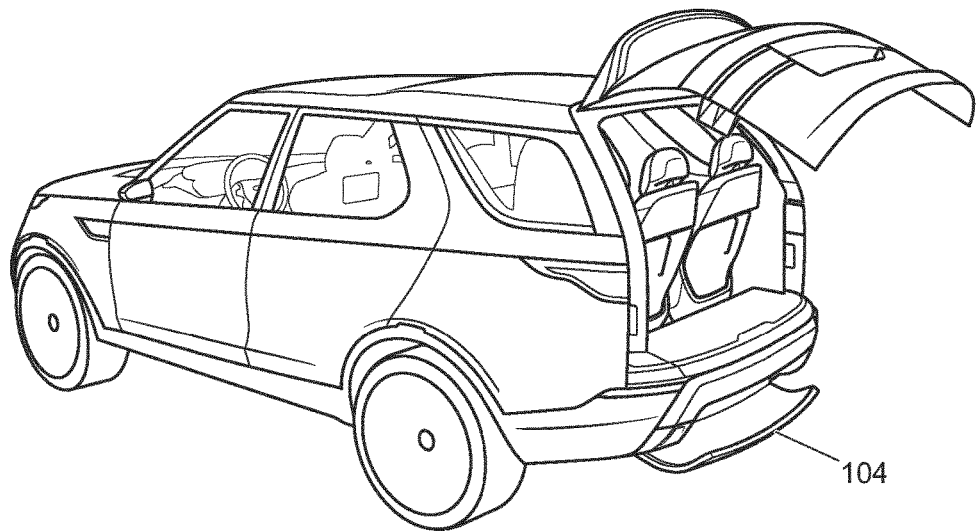

The rear bumper 104 is then opened as shown in FIG. 1c, pivoting downwards and rotating about a horizontal axis proximate to the underside of the vehicle 100. The bumper 104 is configured to be a damage tolerant sacrificial part of the vehicle 100 that reduces damage to other parts of the vehicle 100 in the event of a collision. The bumper is also configured to be a moveable cover for the deployable platform. In other embodiments, other parts of the vehicle bodywork may be configured to conceal the platform.

Figure 1D:
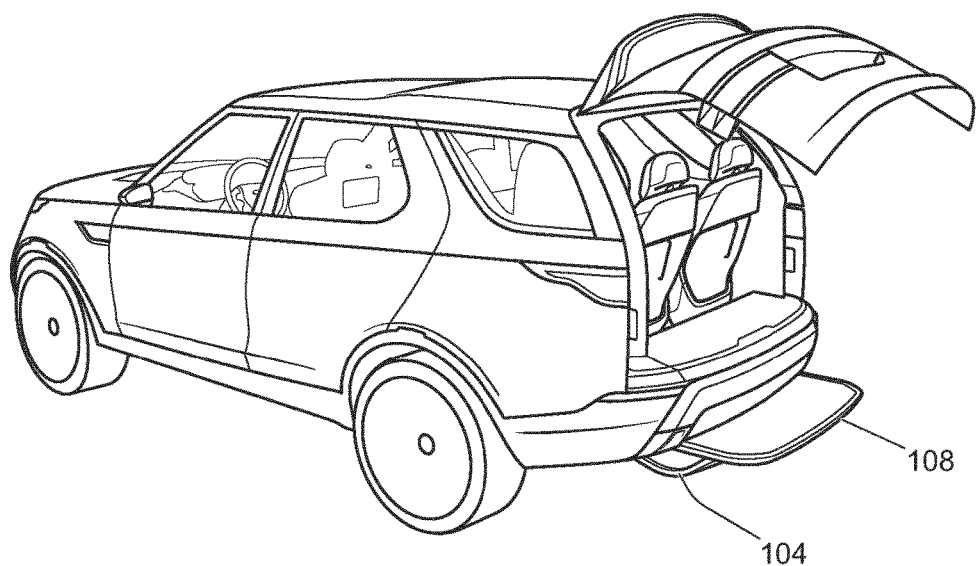

FIG. 1d shows the deployable platform 108 in its deployed configuration. The deployable platform 108 is arranged on a first end of a telescopic arm (see FIGS. 3a to 3d) that allows it to slide out from its stowed position behind the bumper 104. A second end of the telescopic arm is anchored to the chassis of the vehicle 100. The telescopic arm comprises interlocks to securely hold the arm in the extended and retracted configurations. In other embodiments, more than one telescopic arm may be used to support the platform 108.

Figure 1E:
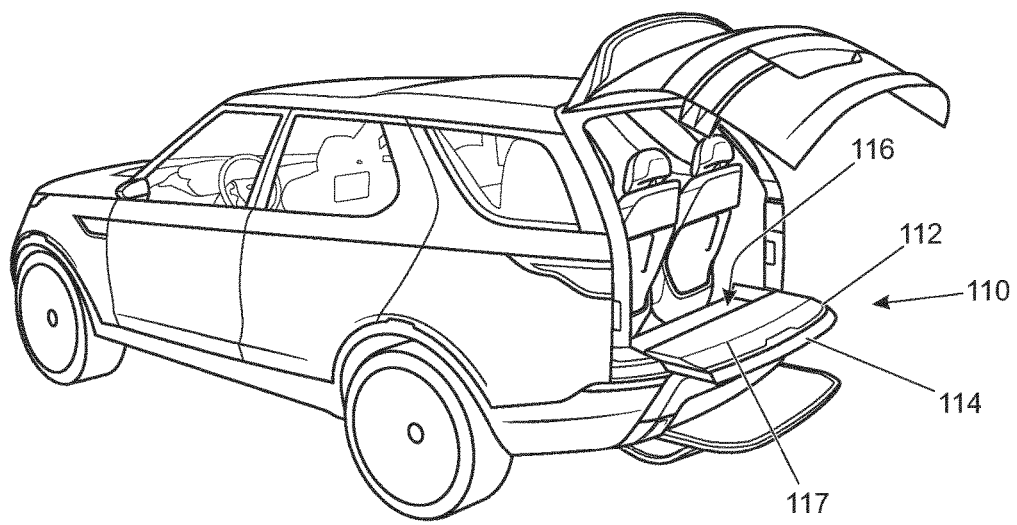

The seat device is deployed in two stages. Firstly, as shown in FIG. 1e, the seat device 110 is extended out from the base of the boot 106. The seat device 110 comprises a seatback 112 and a seat 114. In FIG. 1e, the seat device is shown in its closed configuration, with the seatback 112 folded down on to the seat 114. The front of the seatback 123 and the seat 114 comprise complementary shapes such that the back of the seatback 117 forms the flat load floor of the boot 106. The seat device comprises runners that are proximal to the sides of the seat 114. The runners are used to slide the seat device 110 from its stowed position in the boot 106. In other embodiments, the seat device 110 may slide out of the boot 106 on a rail, a guide or a track.

Once the first stage of deploying the seat device 110 is complete, a well 116 is revealed below the load floor of the boot 106. The well may be arranged to contain luggage or a spare wheel and a set of tools. The runners proximal to the sides of the seat 114 are arranged to maximise the opening of the well 116.

The first stage deployment of the seat device 110 may be used independently of the platform 108 to ease the loading of goods into the boot 106 of the vehicle 100 as it effectively brings the floor of the boot (i.e. the back of the seatback 112) out of the vehicle. In other embodiments, the back of the seatback 112 may comprise hooks and/or netting to aid in securing luggage items.

Figure 1F:
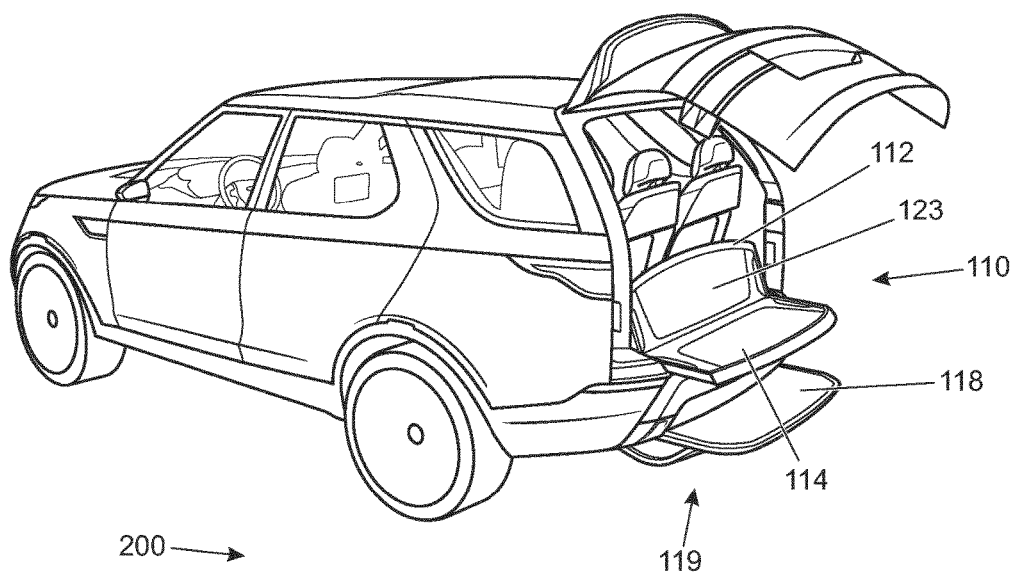

The second stage of deployment of the seat device 110 into its open configuration involves the seatback 112 rotating into a substantially upright position. This is shown in FIG. 1f, where the seat device and the platform are both shown in their respective deployed configurations into a seating system 119. In other embodiments, the seat device 110 may be arranged to deploy into its open configuration prior to sliding out from the boot 106 of the vehicle 100.

Once the seat device 110 is deployed, the seat device forms a bench suitable for one or more users to sit on. The deployed seat device 110 may be relatively high off the ground 200. Accordingly, the users may use the platform 108, which may be further away from the vehicle 100 than the seat device 110, as a step or support surface to ease access to the seat device 110 and/or as a footrest when using the seat device 110.

In order to stow the seat device 110 and the platform 108, the sequence is reversed as shown going from FIG. 1f to 1a.

The platform 108 in its deployed configuration can fully support the weight of a plurality of users, and the telescopic arm is arranged to transfer the load to the vehicle chassis. The first side 118 of the platform 108 is contoured and textured to improve grip for users, for example, comprising a rubber surface, a diamond plate pattern, a ridged pattern, or any other contoured and textured profile.

When the vehicle is in the configuration shown in FIG. 1d, it also increases the ease of access for domesticated animals such as dogs that may use the platform 108 to access the boot 106.

Figure 2A:
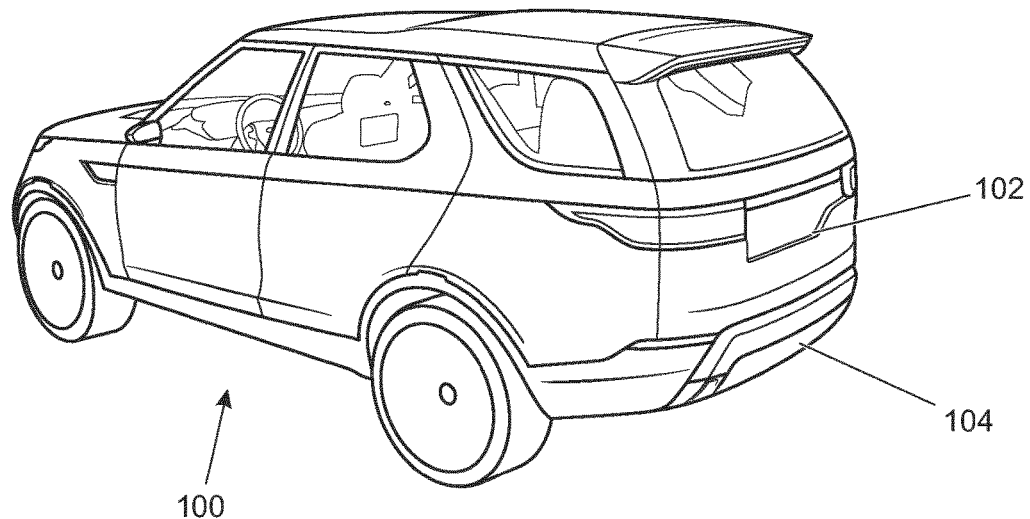
FIGS. 2a to 2h are schematic diagrams showing a deployable platform in accordance with another aspect of the present invention.
Figure 2B:
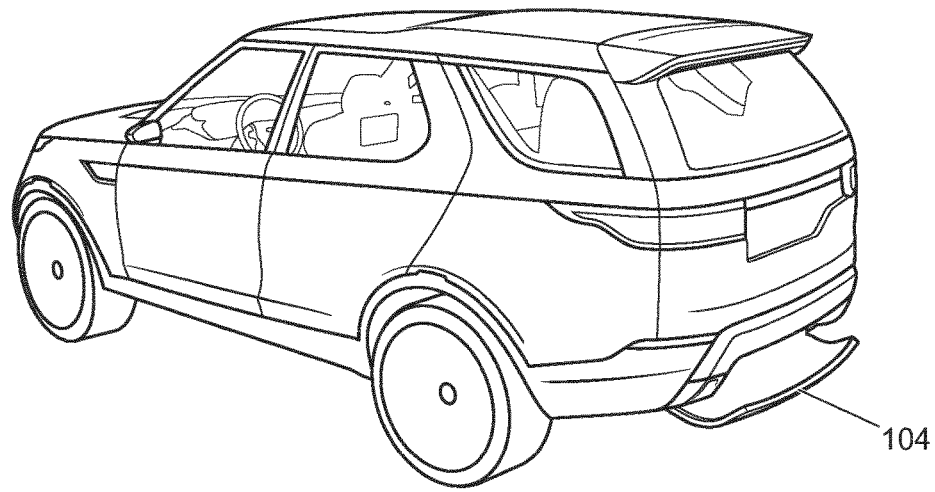
Figure 2C:
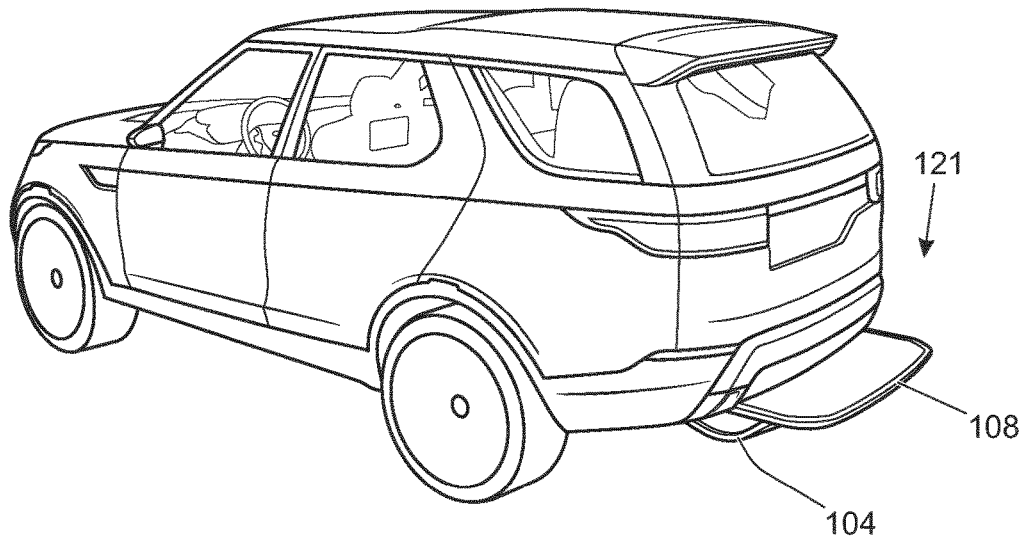

The platform 108 may be deployed independently of the seat device 110. FIGS. 2a to 2c show the platform being deployed while the tailgate 102 remains closed.

FIG. 2a shows the vehicle 100 comprising a platform system with the platform 108 in its stowed configuration. The rear bumper 104 is then opened as shown in FIG. 2b, pivoting downwards and rotating about a horizontal axis proximate to the underside of the vehicle 100. The deployable platform 108 is supported by the telescopic arm which extends out to deploy the deployable platform 108. FIG. 2c shows the deployable platform 108 of the platform system 121 in its deployed configuration. In the configuration shown in FIG. 2c, the platform may be used as a vantage point.

Figure 2D:
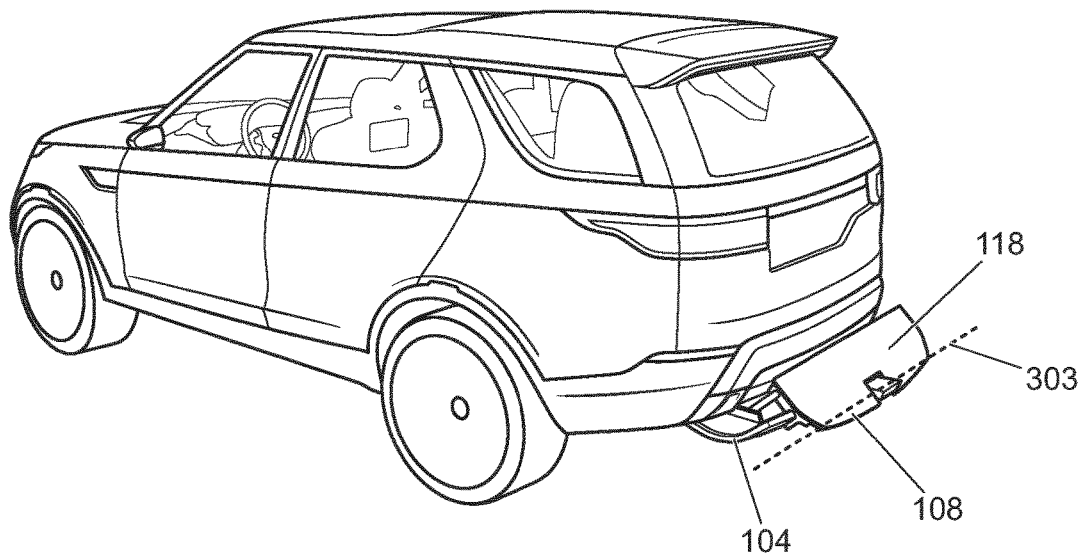
Figure 2E:
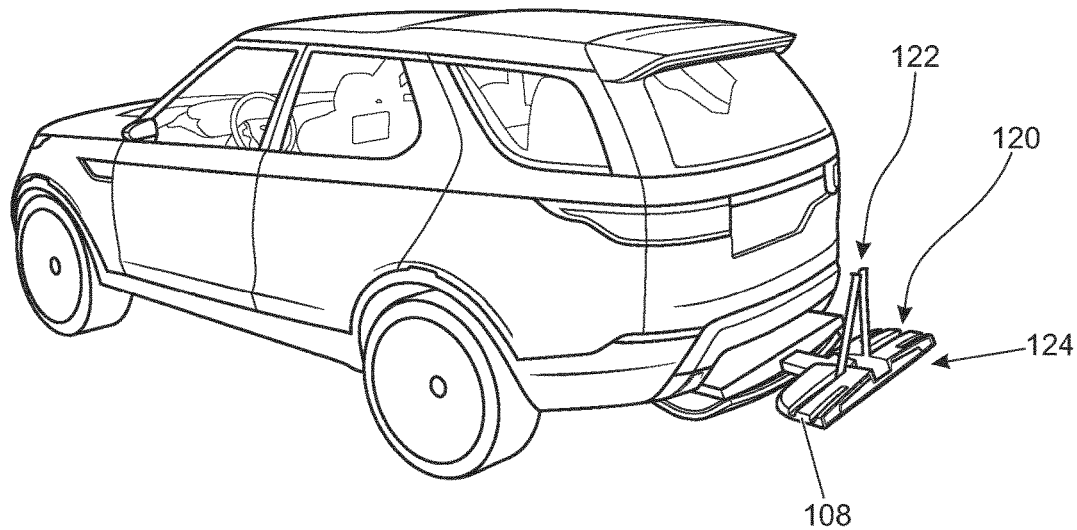
Figure 2F:
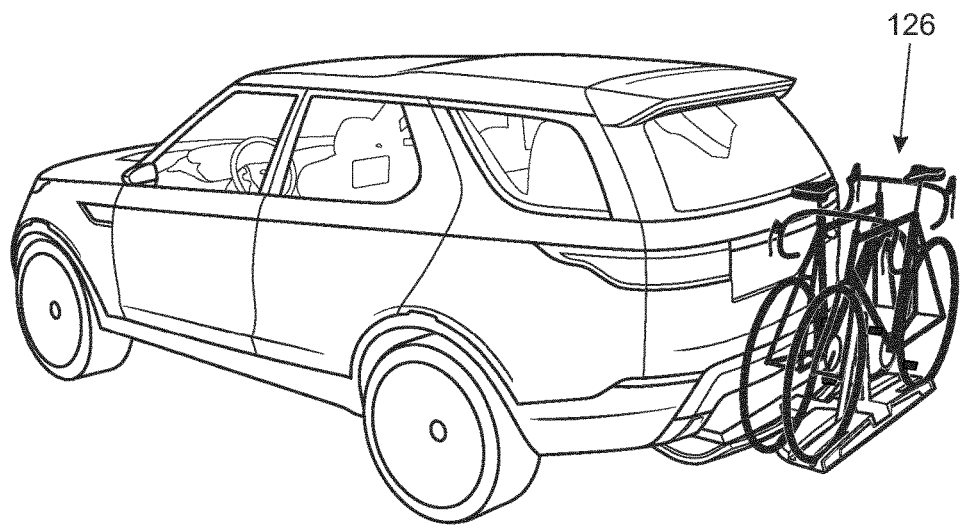

In accordance with another aspect of the present invention, the platform 108 comprises a further stage of deployment as shown in FIGS. 2d to 2f.

The platform 108 is configured to rotate about an axis of rotation 303 proximate to the first end of the telescopic arm. FIG. 2d shows the platform 108 rotating with the first side 118 pointing away from the vehicle 100. The rotation continues for approximately 180 degrees from its starting orientation, until a second side 120 of the platform 108 faces upwards (see FIG. 2e).

The second side 120 is configured as a bicycle rack to receive one or more bicycles. The second side 120 comprises mounting arms 122 that are configured as means for securing each bicycle frame and grooves for the each bicycle wheel. The rear edge of the platform 108 in the bicycle rack configuration comprises lights 124. The lights 124 as shown in the example of FIGS. 2e (and 2f) include one or more from the group comprising a rear position light, a brake light, a reversing light and at least two turn signal lights. The lights 124 are controlled by a driver of the vehicle (for example, via a dashboard) and duplicate the lights on the rear of vehicle which may be obscured from other vehicles when bicycles are attached to the bicycle rack. Additionally or alternatively, the rear edge of the platform 108 in the bicycle rack configuration may comprise reflectors.

FIG. 2f shows two bicycles 126 mounted to the bicycle rack configuration of platform 108.

Figure 2G:
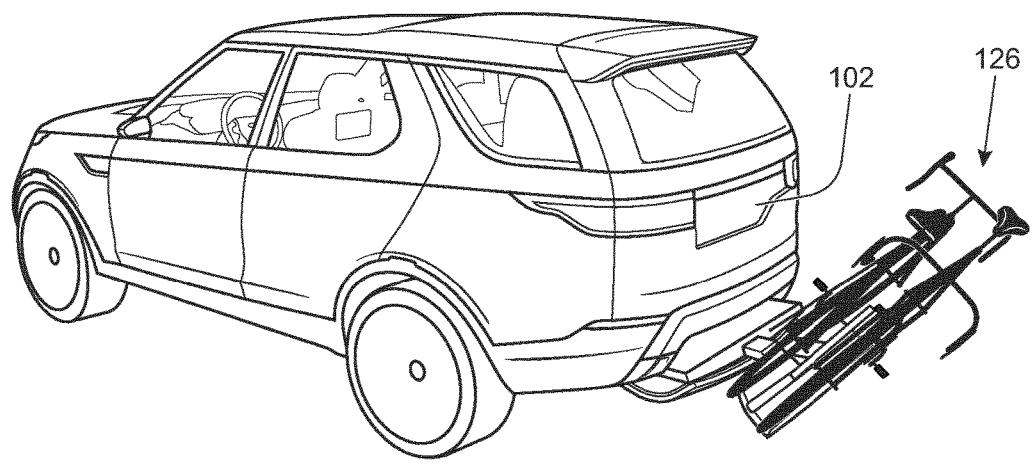
Figure 2H:
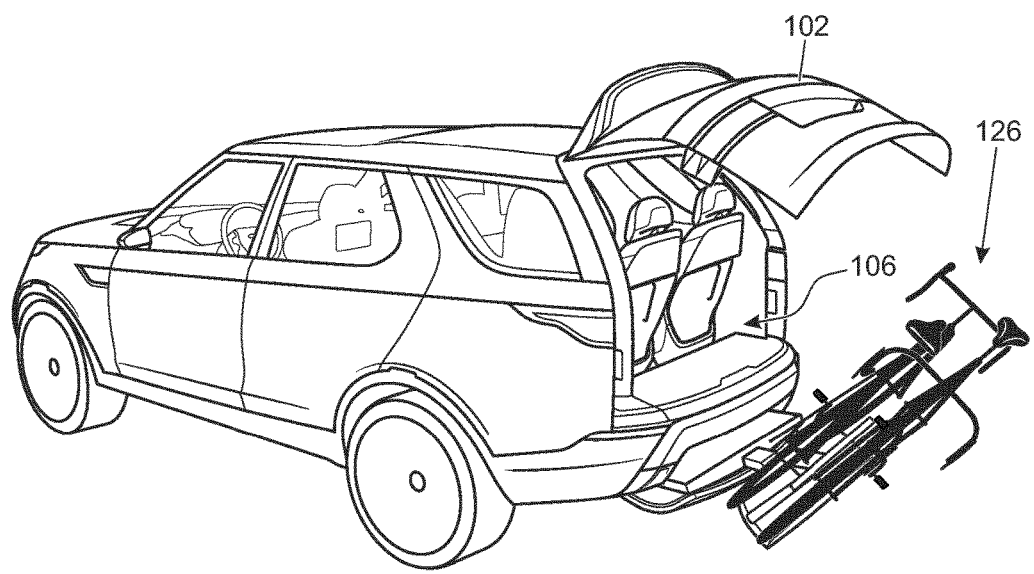

The platform 108 can be further rotated to point the bicycle rack away from the vehicle 100 as shown in FIG. 2g. This allows the tailgate 102 to be opened even when bicycles 126 are attached to the platform 108 as shown in FIG. 2h. The platform 108 comprises a plurality of interlocks to hold securely the platform 108 at the desired angle.

Figure 3A:
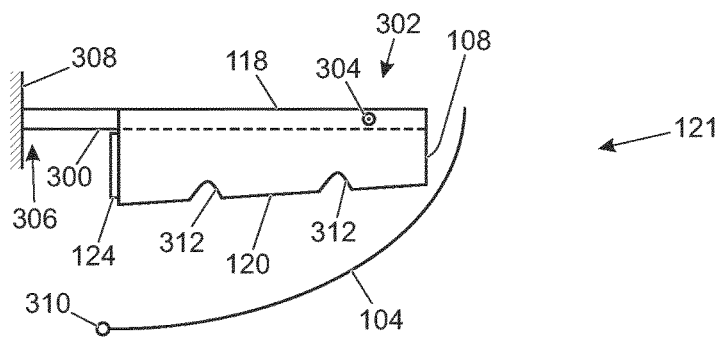
FIGS. 3a to 3d are schematic diagrams showing a side view of the deployable platform in different configurations.

FIG. 3a shows a side view of the platform system 121 in its stowed configuration. The telescopic arm 300 is connected at the first end 302 to the platform 108 via a hinge joint 304. The second end 306 of the telescopic arm 300 is anchored to the chassis 308 of the vehicle 100, for example, via bolts, screws or other suitable means of fastening. In other embodiments, the second end 306 of the telescopic arm 300 is anchored to the body structure of the vehicle 100. The bumper 104 is shown closed in FIG. 3a to conceal the stowed platform 108 and is configured to open by pivoting downwards and rotating about a horizontal axis 310 proximate to the underside of the vehicle 100.

The second side 120 of the platform 108 is shown with a pair of grooves 312 that are arranged to receive the wheels of the bicycles.

Figure 3B:
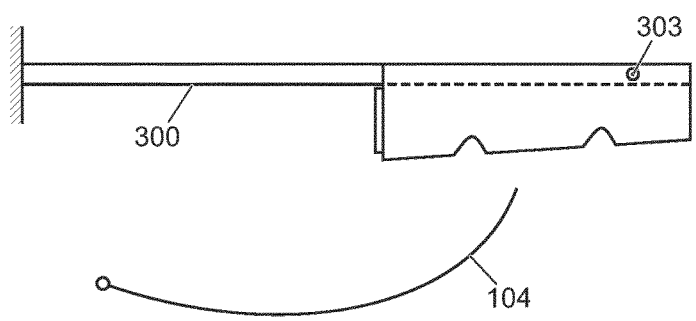
Figure 3C:
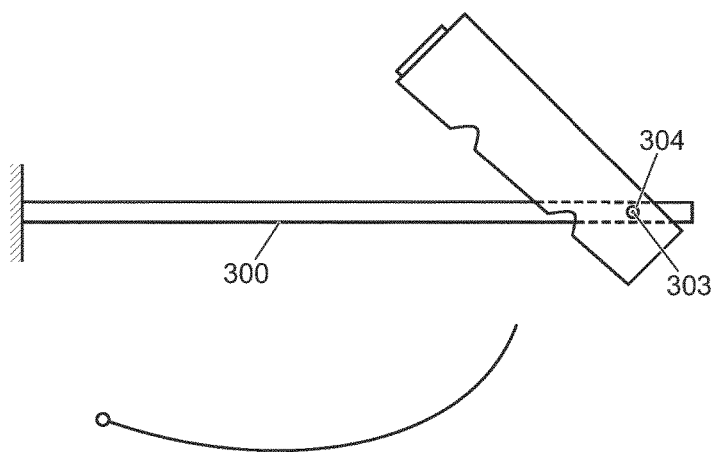

In FIG. 3b, the bumper 104 has opened and the telescopic arm 300 has extended to deploy the platform 108. The platform 108 is connected to the telescopic arm via a hinge joint 304. FIG. 3c shows the platform 108 rotating about an axis 303 governed by the hinge joint 304. The axis 303 extends substantially in the y-direction of the vehicle, i.e. laterally with respect to the vehicle.

Figure 3D:
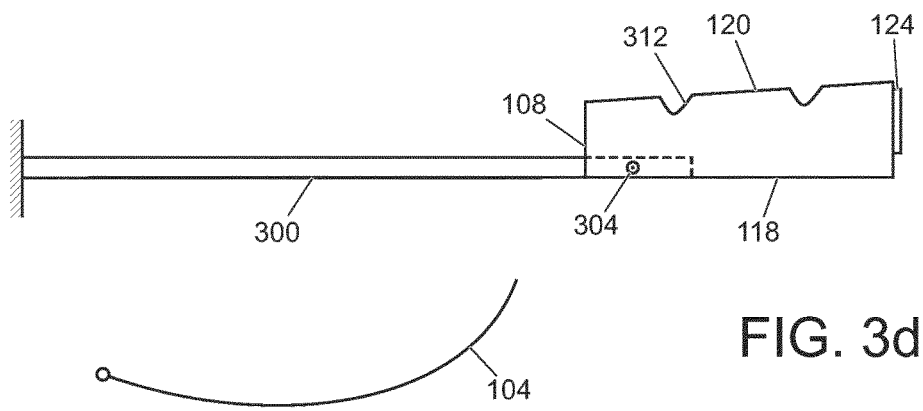

FIG. 3d shows the platform 108 with the second side 120 facing upwards in the bike rack configuration. The hinge joint 304 is located at a distal end of the platform 108 (i.e. distal with respect, in use, to a vehicle), and this means that, the platform in its bike rack configuration is located further away from the vehicle, i.e. further behind the vehicle, than when in its step/support surface configuration (as shown in FIG. 3b). This increased spacing from the vehicle 100 reduces the risk of any bicycles attached to the bike rack causing damage to the vehicle 100. To achieve an increased spacing, the hinge joint 304 and axis of rotation 303 may be located anywhere between a longitudinally central position on the platform and the edge of the platform distal from the vehicle. Optionally, the axis of rotation 303 is between the distal edge of the platform and a position halfway between the longitudinally central position and the distal edge.

In other embodiments, the axis of rotation 303 (which extends substantially in the y-direction) may be at a position on the platform which is substantially central in the longitudinal direction (i.e. x-direction). In such a case, rotation of the platform into the bike rack configuration will not provide increased spacing of the platform from the vehicle. Instead, in order to provide the increased spacing from the vehicle in the bike rack configuration, the telescopic arm 300 may be configured to extend further to allow the platform 108 to deploy the bicycle rack configuration further away from the vehicle 100, i.e. the telescopic arm 300 may be arranged to extend and be locked into more than one extended position. In another embodiment, a combination of a further extended position and an axis of rotation between the central position and the distal edge of the platform may be used to achieve increased spacing of the platform from the vehicle in the bike rack configuration.

Many modifications may be made to the above examples without departing from the scope of the present invention as defined in the accompanying claims.

For example, the platform may be joined to the telescopic arm via more than one hinge joint. In the above embodiment the platform is movably or deployably attached to the vehicle via an attachment element which is a telescopic arm, but the skilled man will appreciate that other attachment element or elements may be used. For example, the platform 108 may be attached via a hinge mechanism, and so deploy by rotating rather than by the sliding action of the telescopic arm. Similarly, the seat may be movably or deployably attached to the vehicle via attachment elements which are runners, but the skilled man will appreciate that other attachment element or elements may be used. For example, the seat may be attached via a hinge mechanism.

A further example is where the first side 118 of the platform 108 may be used as a bicycle rack as well as a footrest and step/support surface. This reduces the complexity of the deployment mechanism as the platform 108 would not have to rotate to change between footrest and bicycle rack configurations.

In addition to lights 124, the rear edge of the platform 108 in the bicycle rack configuration may further comprise a registration plate holder.

In another embodiment, the platform system may be as described above, with the difference that it is not deployable from the vehicle. That is, instead of the platform being supported by and attached to the vehicle by a support member such as a telescopic arm, the platform may instead be supported in a position for use and attached to the vehicle by a static attachment member or arm. The arrangement still benefits from the feature of the platform being moveable between first and second configurations, the first configuration providing a step or support surface, and the second configuration providing a bicycle rack. As in the above embodiment, the platform can still be attached rotatably to the support member via a hinge, for rotation between the first and second configurations.

The invention claimed is:

1. A seating system for use with a vehicle, the seating system comprising:
    a seat device arranged proximal to a rear edge of the vehicle and moveable between an open configuration and a closed configuration, the seat device comprising a seat and a seatback, wherein:
        in the open configuration, the seatback and seat are separated such that a user can sit on the seat with their back against the seatback; and
        in the closed configuration, the seatback is at least substantially positioned on top of the seat; and
    a platform arranged to be moveable between a stowed configuration and a deployed configuration, wherein, in the deployed configuration, the platform is arranged to be positioned for use as a footrest by the user seated on the seat device.

2. The seating system of claim 1, wherein the seat device is arranged to be deployed at least partially beyond the rear edge of the vehicle.

3. The seating system of claim 1, wherein the vehicle comprises a boot and the seat device forms at least part of a load floor of the boot when in the closed configuration.

4. The seating system of claim 2, comprising at least one from the group of: a runner, a rail, a guide and a track; and wherein the seat device is arranged to be deployed at least partially beyond the rear edge of the vehicle by sliding.

5. The seating system of claim 3, wherein the seat device comprises a seat and a seatback, and wherein a back of the seatback is substantially flat to form the at least part of the load floor of the boot when the seat device is in the closed configuration.

6. The seating system of claim 2, wherein, if the seat device is deployed at least partially beyond the rear edge of the vehicle, the platform is further beyond the rear edge when in the deployed configuration.

7. The seating system of claim 1, wherein the front of the seatback is of complementary shape to the seat of the seat device, and/or the seat device is a bench-style seat, and/or the seat device comprises a seat and a seatback, wherein the back of the seatback comprises a means for securing objects.

8. The seating system of claim 1, wherein the platform is arranged to be concealed by a moveable cover when in the stowed configuration, and/or wherein the platform is arranged in its deployed configuration to provide a step disposed partway between ground level and a lower edge of a vehicle closure element opening, and/or wherein a first side of the deployable platform comprises a means for enhancing grip.

9. The seating system of claim 1, wherein the platform is arranged in its deployed configuration to provide a means for securing at least one bicycle.

10. The seating system of claim 1, further comprising a means for rotating the platform when in the deployed configuration, wherein the means of rotating the platform is arranged with interlocks to optionally secure the platform at a plurality of angles.

11. The seating system of claim 1, wherein the platform is arranged in its deployed configuration to provide:
    a support surface disposed partway between ground level and a lower edge of a vehicle closure element opening; and/or
    a means for securing at least one bicycle.

12. The seating system of claim 11, wherein a first side of the platform comprises the support surface and a second side of the platform comprises the means for securing at least one bicycle.

13. The seating system of claim 11, further comprising a means for rotating the platform, wherein the means for rotating the platform is arranged with interlocks to optionally secure the platform at a plurality of angles.

14. The seating system of claim 1, wherein the platform comprises lights.

15. The seating system of claim 1, wherein the platform comprises a registration plate holder.

16. The seating system of claim 1, further comprising a means for deploying the platform, wherein the means for deploying the platform comprises at least one from the group comprising of: a telescopic arm, a runner, a rail, a guide, a track or a hinge, and/or wherein the means for deploying the platform comprises an actuator.

17. The seating system of claim 1, wherein the platform is arranged to be hidden within the vehicle bodywork when in the stowed configuration and is arranged to be at least partially located at least partially outside the vehicle bodywork when in the deployed configuration.

18. A vehicle comprising the seating system of claim 1.

19. The vehicle of claim 18, wherein the seat device of the seating system faces away from the vehicle when deployed at least partially beyond the rear edge of the vehicle, and/or wherein the vehicle further comprises a means for moving a moveable cover.

* * * * *